United States Patent [19]

Cuypers

[11] Patent Number: 4,645,478
[45] Date of Patent: Feb. 24, 1987

[54] DRIVE BELT

[75] Inventor: Martinus H. Cuypers, Eindhoven, Netherlands

[73] Assignee: Gayliene Investments Ltd., Great Britain

[21] Appl. No.: 641,601

[22] Filed: Aug. 17, 1984

[30] Foreign Application Priority Data

Aug. 24, 1983 [NL] Netherlands .......................... 8302959

[51] Int. Cl.⁴ ................................................ F16G 5/18
[52] U.S. Cl. ..................................... 474/201; 474/242
[58] Field of Search ................................ 474/201, 242

[56] References Cited

U.S. PATENT DOCUMENTS 3,949,621  4/1976  Beusink ............................. 474/242 X
4,303,403  12/1981  Lamers ................................. 474/201
4,498,892  2/1985  Huntley ........................... 474/201 X

FOREIGN PATENT DOCUMENTS 2414989  10/1975  Fed. Rep. of Germany ...... 474/201
7900923  2/1979  Netherlands .
256918  9/1948  Switzerland ........................ 474/201

Primary Examiner—Stuart S. Levy
Assistant Examiner—Katherine Matecki
Attorney, Agent, or Firm—Ostrolenk, Faber, Gerb & Soffen

[57] ABSTRACT

Drive belt comprising an endless carrier band 4 and plate-shaped transverse members 1 with a central recess 5 for the band 4 the top edge 9 of the recess, starting from one of the upstanding side edges 8, extending over at least half the width of the carrier band 4 and being connected to a narrow slot 13 which opens into the top edge 10 of the member 1 and via which the transverse members 1 can be fitted around the band 4 with the slot 13 alternately facing one or the other edge of the band.

7 Claims, 23 Drawing Figures

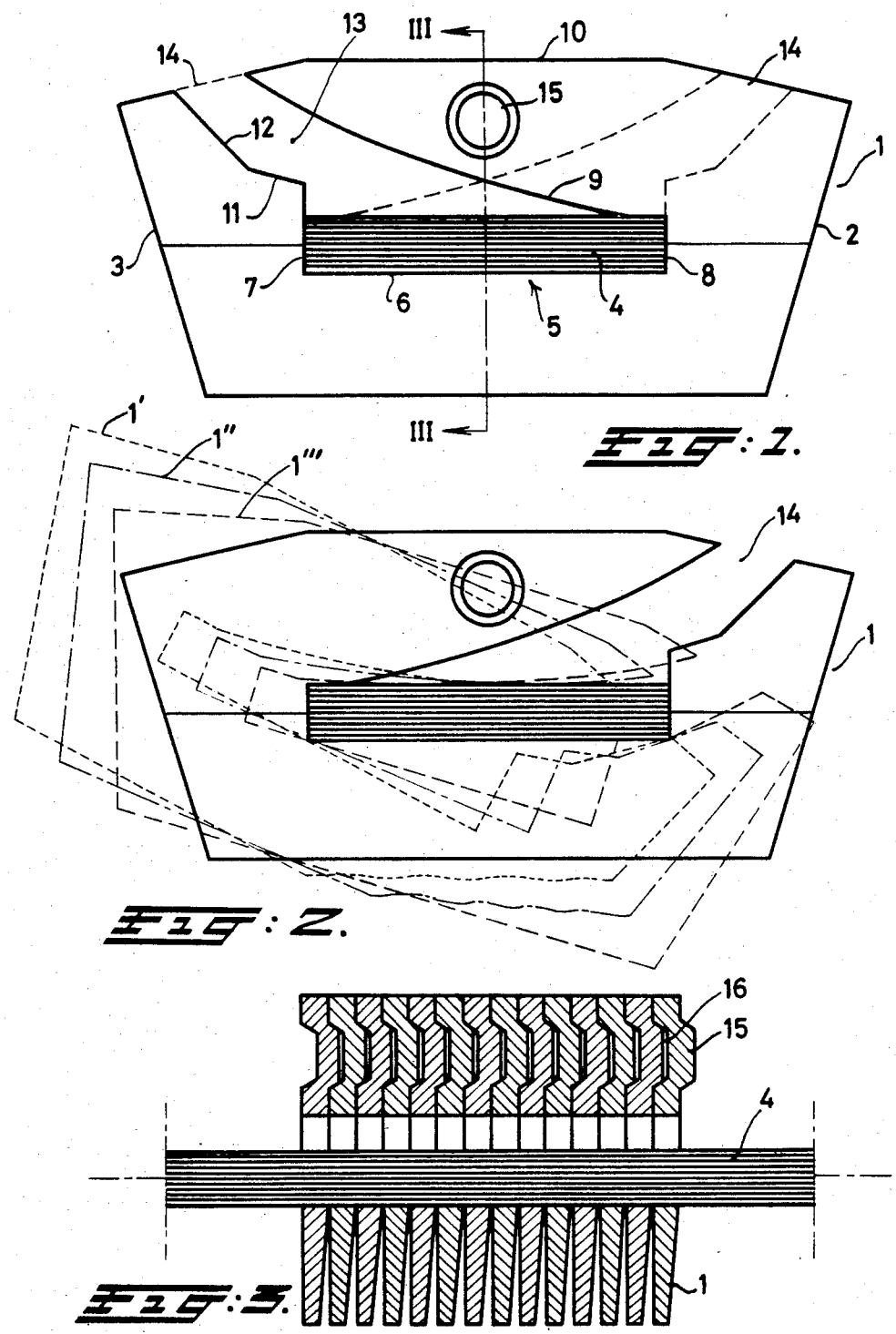

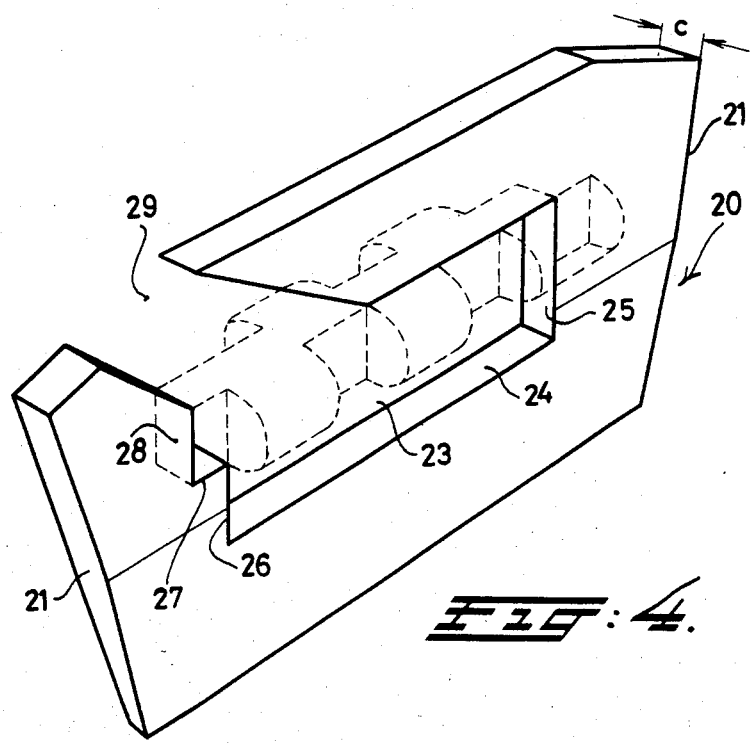
FIG: 4.
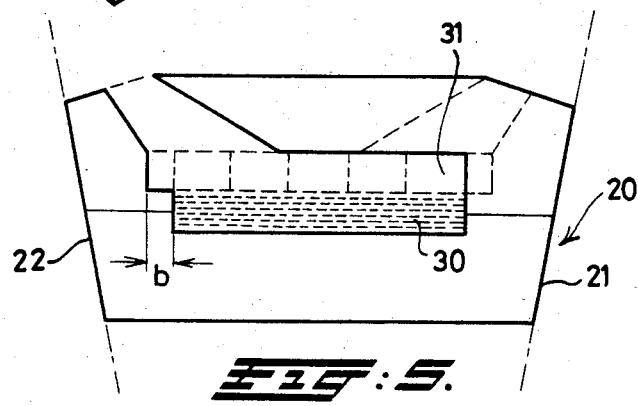
FIG: 5.
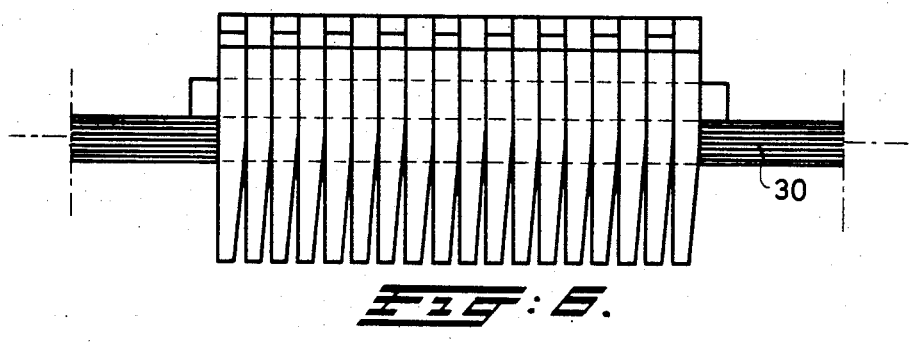
FIG: 6.

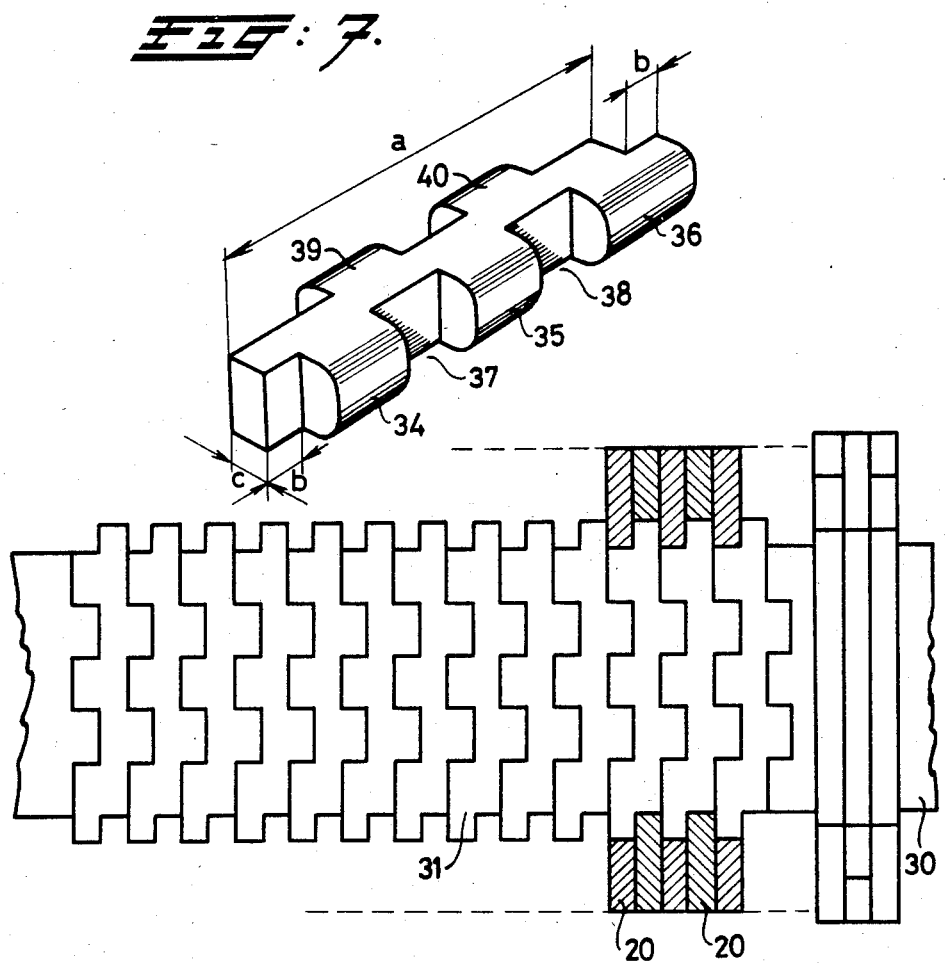

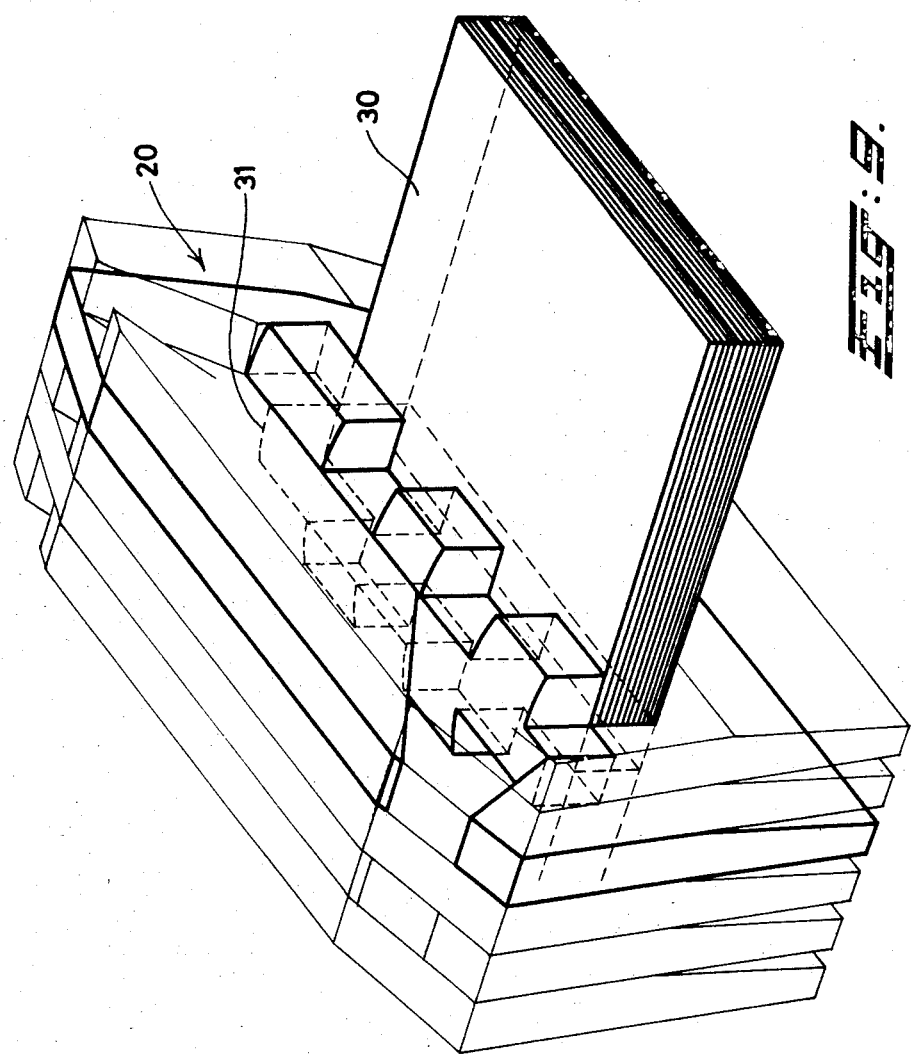

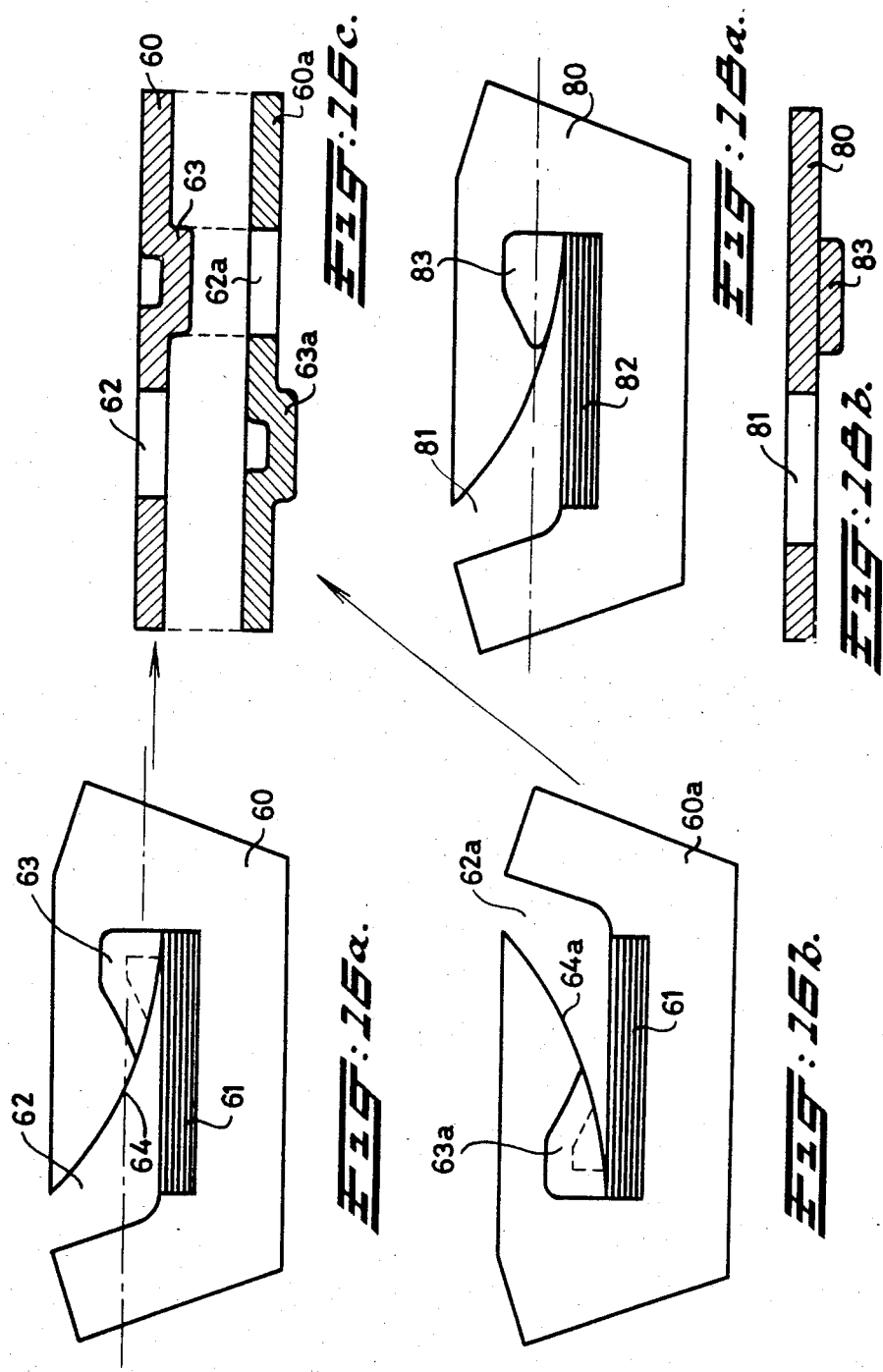

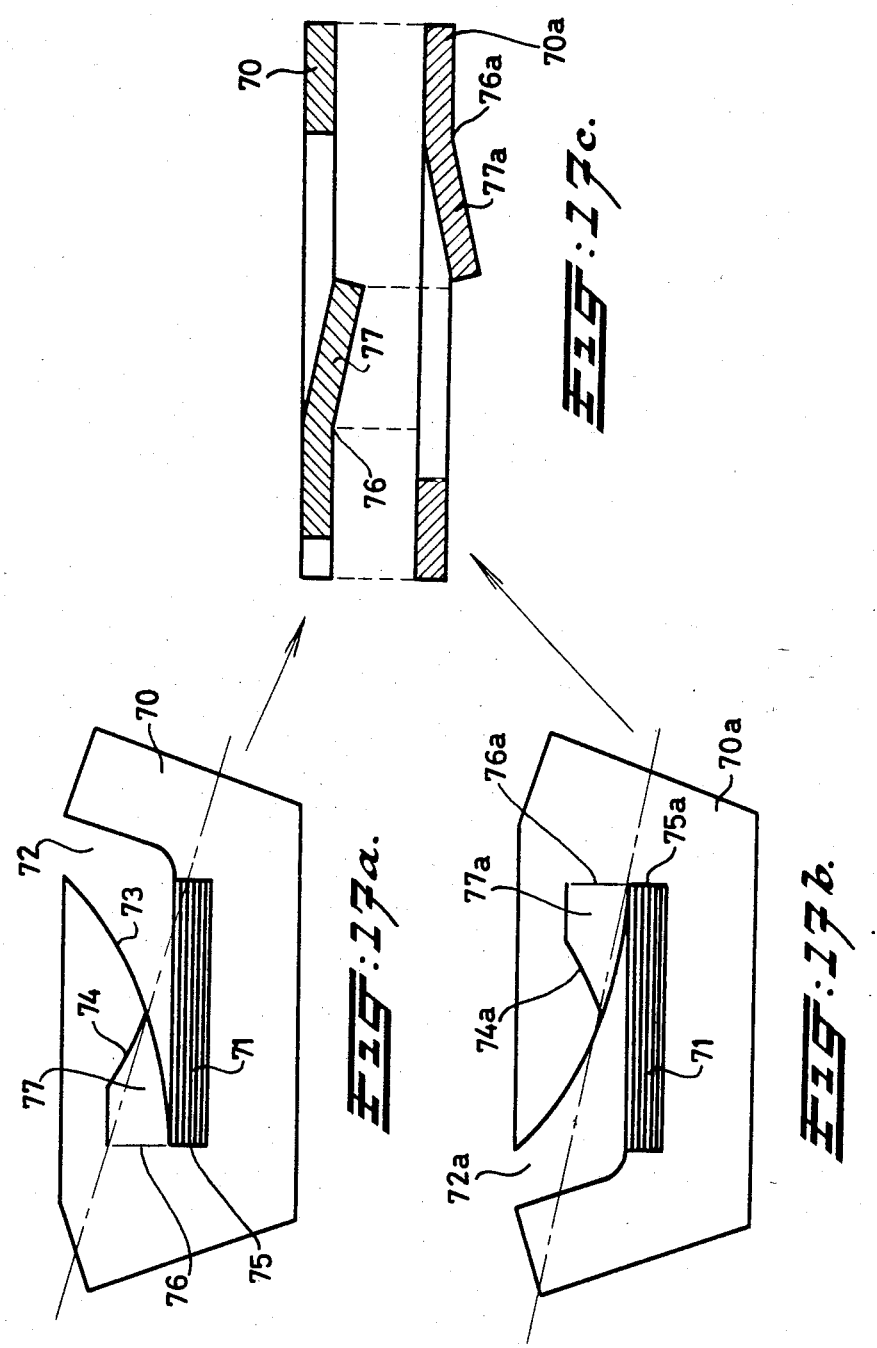

DRIVE BELT

BACKGROUND OF THE INVENTION

The invention relates to a drive belt comprising an endless carrier band supporting plate-shaped tranverse members each having a central recess for the band, the recess being bounded by a bottom edge, two upstanding side edges and at least one top edge portion, and each provided with means for maintaining the positions of the members relative to one another.

Providing the transverse members with a central recess for the band instead of with two recesses which end into the respective upstanding side edges has several advantages: the transverse members have less tendency to tilt during use of the belt, there is no fast destruction of the entire carrier bandpacket when one of the bands thereof breaks; when the members have the same height the members with a central recess have a greater edge surface which is into contact with the pulleys and the loading of the transverse member is better.

It is, however, in such a configuration not possible to close the upper edge of the recess by a separate locking element, as the thickness of the transverse member is only small. Thus the locking of the carrier band must be effected by parts of the transverse member which lie above the recess so that the entry to the recess is restricted. Then the carrier bands undergo a strong deformation when they are brought into the recess which makes it impossible to use bands of a high quality; another possibility as proposed in Dutch Patent Application No. 79,00923 is to bend out the parts of the transverse members prior to the insertion of the bands and bend them back into shape afterwards. However, this is only possible when one uses pliable transverse members with low hardness.

The aim of the invention is to eliminate these drawbacks.

SUMMARY OF THE INVENTION

According to the invention in the transverse member the top edge of the recess, starting from one of the upstanding side edges, extends over at least half the width of the carrier band and is connected to a narrow slot which opens into the top edge of the member and via which the transverse members can be fitted around the band with the slot alternately facing one or the other edge of the band.

Fitting of the transverse member around the band is done by bringing the transverse member through the slot around the band and then by tilting band and transverse member in such a way with respect to each other that eventually the band lies in the recess. During this operation there is no necessity to deform the band so that the material of the band can be chosen to be optimal for the function thereof.

In an embodiment in which the locking of the transverse members with respect to each other does not call for projections or cut-outs in the transverse member itself according to the invention the upstanding edge situated near the insertion slot, starting from the bottom edge of the latter, defines the recess for the band over a part of its height in conjunction with the oppositely situated upstanding edge, and then, being offset over a determined distance, merges into a portion lying further to the outside and defining, together with the opposite edge and the upper side of the band, a recess for a part of a retaining element consisting of:

a. a central rectangular body portion of a length equal to the width of the recess and of a width equal to the thickness of a transverse member;

b. on one side thereof a number of projections which are separated by cut-outs and the width of which is equal to the thickness of a transverse member, the two outermost projections having an edge boundary extending transversely to the longitudinal direction of the retaining element, the first of them lying inside the end edge of the body part over a distance equal to the width of the offset distance and the second end edge lying over an equal distance outside this end edge;

c. on the other side, a series of projections situated opposite and closely fitting into the said cut-outs.

Other favorable embodiments according to the invention are described in the subclaims 3–7.

BRIEF DESCRIPTION OF THE DRAWINGS

FIG. 1 is a front elevation of a transverse member of a drive belt according to the invention, mounted on the carrier band of the drive belt;

FIG. 2 illustrates the fitting of a transverse member around the carrier band;

FIG. 3 is a section on the line III—III in FIG. 1;

FIG. 4 shows in perspective a second embodiment of a transverse member for a drive belt according to the invention, with the retaining element used therein;

FIG. 5 is an elevation of the transverse member and retaining element;

FIG. 6 is a side view of part of a drive belt provided with transverse members and retaining elements of this type;

FIG. 7 is a view in perspective of the retaining element used;

FIG. 8 shows the combination of retaining elements and transverse members;

FIG. 9 shows a combination of a transverse member and retaining element in perspective, shown partly cut away;

FIGS. 16a–16c show another embodiment of a transverse member for a drive belt according to the invention;

FIGS. 17a–17c show yet another embodiment;

FIGS. 18a–18b show still another embodiment of the invention.

FIG. 1 shows a front view of a transverse member according to the invention, indicated as a whole by the reference numeral 1. It has the trapezium shape known per se. The sloping sides 2, 3 cooperate with the conical inside surfaces, facing each of them, of the transmission pulleys, and the members 1 are mounted on the carrier band 4, which in the usual manner consists of a packet of thin metal bands fitting one around the other.

DESCRIPTION OF THE PREFERRED EMBODIMENTS

Figure 10:
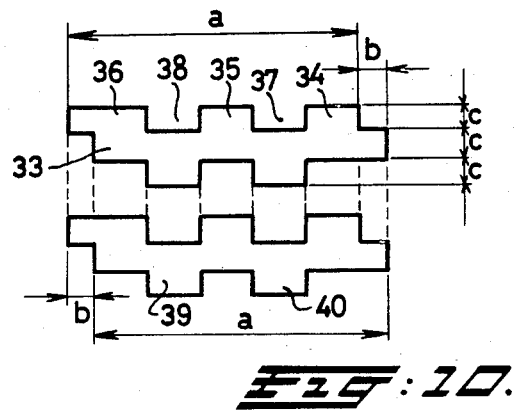
FIGS. 10 to 12 show different types of retaining elements.

The band 4 is situated in the central recess 5 comprising a bottom edge 6 and upstanding side edges 7, 8.

According to the invention this recess 5 is closed at the top by the top edge 9 which, starting from the upstanding side wall 8, extends to the top edge 10 of the transverse member 1. The upstanding side wall 7 is continued by a portion 11, which extends practically transversely, into a portion 12 extending obliquely upwards; the edge 9, on the one hand, and the edges 11, 12 on the other hand delimit in this manner a narrow slot 13 having its opening at the top edge 10. Through this slot the respective transverse members can be fitted around the carrier band 4 in the manner shown in FIG. 2. In FIG. 2 the dash line 1' indicates the first phase of the fitting of the transverse member around the band packet 4; the lines 1" and 1"' indicate intermediate phases. The whole movement is of course made as a continuous movement.

The transverse members are fitted turn by turn around the band 4, that is to say with the opening 14 of the insertion slot 13 alternately on the left and on the right, as shown in FIG. 1. After being fitted, the transverse members must of course be secured against dropping off the band and displacement in the transverse direction relative to one another. FIG. 1 shows how this can be done by means of the combination, known per se, of a projection 15 and a cut-out 16, which in the arrangement according to the invention may advantageously be disposed centrally above the band packet 4.

FIG. 3, which is a cross-section on the line III—III in FIG. 1, shows a part of the complete drive belt with the transverse members mounted on it.

FIG. 4 shows a transverse member according to a different embodiment. The transverse member is indicated as a whole by the reference numeral 20, and has the usual side edges 21 and 22 and a central recess 23 for the carrier band. This recess 23 has the bottom edge 24 and an upstanding right-hand edge 25; the opposite upstanding wall consists of the portion 26, the height of which is equal to the thickness of the band 30 and which is continued by a part 27 extending parallel to the bottom edge 24 to form a second upstanding portion 28. The recess is accessible via the slot 29.

As can be seen in FIG. 5, the recess bounded by the bottom edge 24 and the upstanding walls 25 and 26 is filled by the carrier band 30, and the space thereabove is occupied by a part of a retaining element 31, which is shown in perspective in FIG. 7; FIG. 8 shows the location of the retaining element in relation to the transverse members 20. Each retaining element consists of a central body portion 33, the length a of which is equal to the distance between the upstanding walls 25 and 28; it carries on one side a number of projections 34, 35, 36 separated by intermediate spaces or cut-outs 37, 38. The projection 36 projects a distance b, equal to the length of the edge portion 27, beyond the end edge of the body portion 33, and the projection 34 lies an equal distance b from the other end of the body portion 33. On the other side of the body portion the projections 39 and 40 are provided, lying opposite and fitting into the spaces 37 and 38 respectively.

The width c of the body portion is equal to the thickness of a transverse member, and this dimension coincides with the distance to which the projections 34, 35, 36 extend beyond the body portion 33, and also to the distance to which the projections 39, 39 extend therebeyond.

FIG. 8 shows in top view the combination of transverse members 20, retaining elements 31, and carrier band 30; it is clear that in this manner the transverse members, although slidable in the longitudinal direction of the band, are nevertheless locked in the transverse direction relative to one another.

FIG. 9 shows again the whole arrangement but, in perspective.

Figure 11:
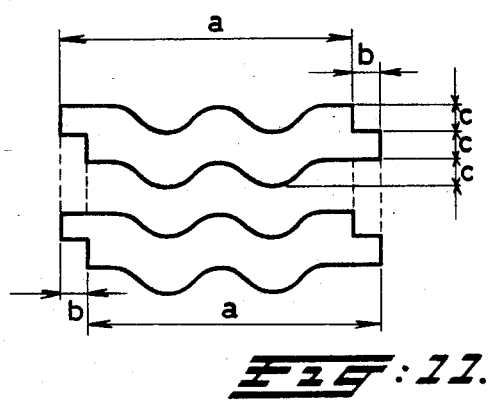
Figure 12:
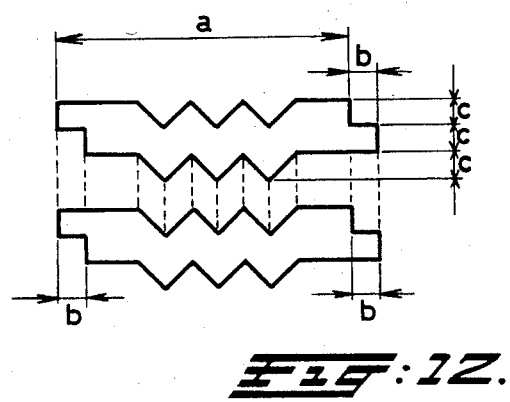

The retaining elements described above have crenellated projections, but obviously any other configuration is possible; FIG. 10 shows an embodiment having rectangular projections; FIG. 11 shows an embodiment having undulating projections, and FIG. 12 shows an embodiment having triangular projections. Here the dimensions a, b, c are as previously indicated.

Another possible way of locking the transverse members with respect to each other is to fill the free space in the carrier band recess by means of members which cooperate with or form part of an adjoining transverse member. This embodiment will be explained with the aid of FIGS. 13 to 17.

Figure 13:
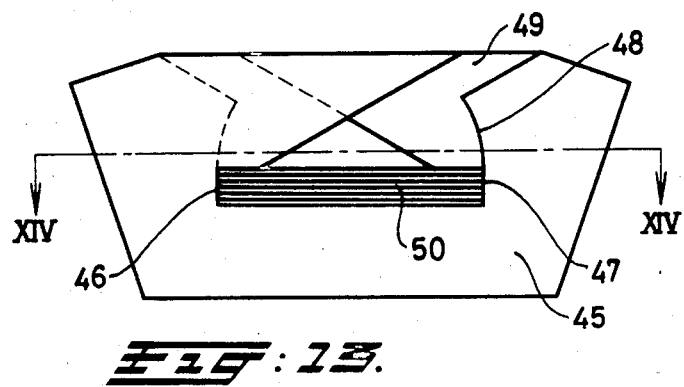
FIG. 13 is an elevation of another embodiment of a transverse member for a drive belt according to the invention.
Figure 14:
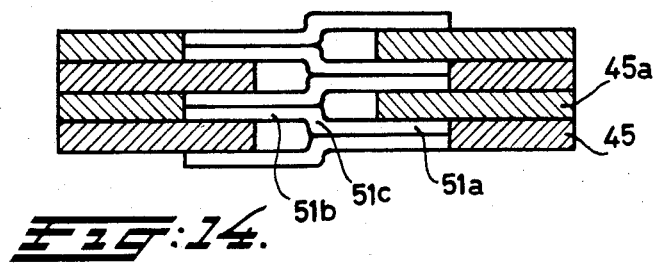
FIG. 14 is a section on the line XIV–XIV in FIG. 13.
Figure 15:
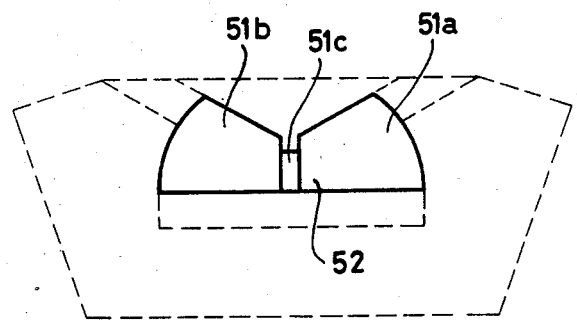
FIG. 15 is a front elevation of the filling member used in accordance with FIGS. 13 and 14.

FIG. 13 shows an embodiment of the transverse member 45, in which the recess for the band has a right-hand upstanding side 46, while the other upstanding side is bounded by a straight portion 47 which merges into a curved portion 48; through the slot 49 the recess is accessible to the carrier band packet 50, of which the individual bands can be introduced by bringing the upstanding side 46 against one edge of the band and then tilting the transverse member so that the curved edge 48 and the right-hand portion 47 of the recess move along the other band edge. Half of the free space remaining above the band is then filled by the half 51a of a filler plate, indicated in general with reference numeral 52 (see also FIG. 15), of which the other half 51b falls within the recess in an adjoining transverse member 45a, the two halves being joined by the sloping portion 51c and having a thickness equal to half the thickness of a transverse member. FIG. 14 shows how the filler members are fitted.

FIGS. 16a, 16b and 16c relate to an embodiment in which the space above the recess of a transverse member is filled by an embossed part, fitting into the said space, of an adjoining transverse member. FIG. 16a shows the transverse member 60 fitted on the band 61 lying in the recess, which is accessible via the slot 62, while FIG. 16b shows an adjoining member 60a mounted on the band 61 introduced via the slot 62a. Each transverse member 60, 60a has an embossed portion 63 and 63a respectively, starting from the top edge boundary 64, 64a of the insertion slot 62 and 62a respectively. When the transverse members lie against each other, the embossed portion 63 of each transverse member 60 fits into the space above the edge of the adjoining member 60a. The whole arrangement is shown in FIG. 16c, in which the transverse members are shown, for the sake of clarity, some distance from one another.

FIGS. 17a, 17b and 17c show a configuration in which the space above the bandpacket is filled by a bent-out portion of an adjoining transverse member. In this embodiment, too, the transverse member 70 has a recess for the band 71 accessible via the insertion slot 72. Starting from the top edge 73 of this slot, an incision 74 is present in the material of the transverse member, and the material bounded by this incision and a bending line 76, forming an extension of the upstanding side 75 of the recess, is bent out, as indicated by the reference numeral 77, to a distance corresponding to the thickness of the transverse member—see FIG. 17c. The material bent out fits into the space in the adjoining transverse member 70a, which is shaped similarly but in a mirror-image arrangement; corresponding parts are given the same reference numerals as in FIG. 17a with the index "a".

In this embodiment, too, when the transverse members lie against each other, there is not only a closed recess for the band, but in addition the members are secured against displacement in the transverse direction relative to one another. Unhindered movement in the longitudinal direction of the band is possible.

It is possible to perform the function of the embossed or bent-out parts 63 and 77 respectively with the aid of an additional part fastened on the member and having a thickness equal to that of a transverse member, just as is illustrated in FIGS. 18a and 18b. Here 80 denotes the transverse member, 81 the insertion slot for the band 82, and 83 the filler part which is, for example, fastened by spot welding.

I claim:

1. Drive belt for driving a pulley or the like, comprising an endless carrier band supporting a plurality of plate-shaped transverse members each having a central recess for the band, each recess being bounded by a bottom edge supported inward of said carrier band, two upstanding side edges supported adjacent to the respective edges of said band, and at least one top edge portion supported outward of said carrier band; and each member further including an aperture for receiving means for maintaining the positions of the members relative to one another;

the top edge of each recess, starting from one of the upstanding side edges extending over at least half the width of the carrier band and being connected to a narrow slot which opens into a top edge of each member which is outward of said carrier band and does not engage such pulley;

the transverse members being configured so as to fit around the band with the slot alternately nearer to one or the other edge of the band.

2. Drive belt according to claim 1, in which in each transverse member has an embossed portion so disposed that substantially half of the central recess situated above the carrier band and toward said slot is at least partly filled by a corresponding embossed portion provided on the adjoining transverse member.

3. Drive belt according to claim 1, in which in each transverse member has a thickened portion so disposed that substantially half of the central recess situated above the carrier band and toward said slot is at least partly filled by a corresponding thickened portion provided on the adjoining transverse member.

4. Drive belt according to claim 1, in which in each transverse member has an embossed portion so disposed that substantially half of the central recess situated above the carrier band and toward said slot is at least partly filled by an embossed portion of an adjoining member, said embossed portion of each transverse member being bounded by an incision formed in said transverse member and by the top edge of the central recess thereof.

5. Drive belt according to claim 1, further comprising a plurality of filler members configured such that in each transverse member substantially half of the central recess situated above the carrier band and toward said slot is at least partly filled by a part of a filler member which is common to two adjoining transverse members, said filler members having a thickness substantially equal to half of that of the transverse members.

6. Drive belt for driving a pulley or the like, comprising an endless carrier band supporting a plurality of plate-shaped transverse members each having a central recess for the band, each recess being bounded by a bottom edge supported inward of said carrier band, two upstanding side edges supported adjacent to the respective edges of said band, and at least one top edge portion supported outward of said carrier band; and each member further including an aperture for receiving means for maintaining the positions of the members relative to one another;

the top edge of each recess, starting from one of the upstanding side edges extending over at least half the width of the carrier band and being connected to a narrow slot which opens into a top edge of each member which is outward of said carrier band and does not engage such pulley;

the transverse members being configured so as to fit around the band with the slot alternately nearer to one or the other edge of the band; and in which the upstanding edge situated nearer to the slot, starting from the portion of said upstanding edge inward of said band, defines each central recess for the band over a part of the height of said upstanding edge in conjunction with the oppositely situated upstanding edge, and then, being offset over a determined offset distance, merges into a portion of said recess lying further toward said slot and defining, together with the opposite upstanding edge and the upper side of the band, said aperture for receiving said maintaining means, and in which said maintaining means comprises a retaining element which includes:

a. a central rectangular body portion of a length equal to the width of each central recess and of a thickness equal to the thickness of one of the transverse members;

b. on one side thereof a number of projections which are separated by cut-outs and the thickness of which projections is equal to the thickness of one of the transverse members, the two outermost projections having respectively a first and a second outer edge boundary extending transversely to the longitudinal direction of the retaining element, the first edge boundary lying inside an end edge of the body portion by a distance equal to the above-mentioned offset distance and the second end edge boundary lying by an equal distance, outside the other end edge of the body portion; and c. on the other side, a series of projections situated opposite said cut-outs and configured so as to closely fit into said cut-outs on said one side.

7. Drive belt according to claim 6, in which said rectangular body portion and said projections and cut-outs comprise a generally crenellated form.

* * * * *